United States Patent
Yu et al.

(10) Patent No.: US 9,389,782 B2
(45) Date of Patent: Jul. 12, 2016

(54) ELECTRONIC DEVICE AND CONTROL METHOD THEREOF

(71) Applicant: COMPAL ELECTRONICS, INC., Taipei (TW)

(72) Inventors: Feng-Yi Yu, Taipei (TW); Ming-Che Weng, Taipei (TW); Wei-Han Hu, Taipei (TW); Jui-Wen Hsu, Taipei (TW); Shih-Hung Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 14/453,624

(22) Filed: Aug. 7, 2014

(65) Prior Publication Data
US 2015/0116237 A1 Apr. 30, 2015

Related U.S. Application Data

(60) Provisional application No. 61/895,411, filed on Oct. 25, 2013.

(51) Int. Cl.
*G06F 3/0488* (2013.01)
*G06K 9/00* (2006.01)

(52) U.S. Cl.
CPC ........ *G06F 3/04883* (2013.01); *G06K 9/00355* (2013.01)

(58) Field of Classification Search
CPC .... G06K 9/00; G06G 3/04883; G06F 3/0488; G06F 3/041; G06F 3/017; G06F 2203/04808; G06F 3/0416
See application file for complete search history.

(56) References Cited

U.S. PATENT DOCUMENTS

2010/0162182 A1* 6/2010 Oh ..................... G06F 3/04883
715/863
2012/0311508 A1* 12/2012 Fleizach ............... G06F 3/0488
715/863

* cited by examiner

*Primary Examiner* — Premal Patel
(74) *Attorney, Agent, or Firm* — CKC & Partners Co., Ltd.

(57) ABSTRACT

Disclosed herein are an electronic device and a control method thereof. The electronic device includes a touch device and a processor. The processor is electrically connected to the touch device. When at least one continuous back-and-forth moving touch trace is formed on the touch device during a predetermined period, the processor switches one of a plurality of modes of the electronic device to another.

12 Claims, 5 Drawing Sheets

ELECTRONIC DEVICE AND CONTROL METHOD THEREOF

RELATED APPLICATIONS

This application claims priority to U.S. Provisional Application Ser. No. 61/895,411, filed Oct. 25, 2013, which is herein incorporated by reference.

BACKGROUND

1. Field of Invention

The present invention relates to devices. More particularly, the present invention relates to electronic devices and control methods thereof.

2. Description of Related Art

Consumer electronics (abbreviated CE) are electronic equipment intended for everyday use, most often in entertainment, communications and office productivity. For example, the consumer electronics may be notebook computers, smart phones, tablets or the like.

The notebook computer is a portable personal computer suitable for mobile use and weighs about 1-3 kg. As notebook computers became smaller, lighter, cheaper, and more powerful and as screens became smaller and of better quality, laptops became very widely used for a variety of purposes. The notebook computer generally includes a LCD display so as to reduce its size. Most modern-day notebook computers also have a full touch interface device pre-installed; however, the way to switch input modes of this device is more complicated, and therefore consumers are not interested in buying these computers.

In view of the foregoing, there exist problems and disadvantages in the related art for further improvement; however, those skilled in the art sought vainly for a suitable solution. In order to solve or circumvent above problems and disadvantages, there is an urgent need in the related field to provide a more convenient way to switch input.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure is directed to provide an electronic device to solve or circumvent aforesaid problems and disadvantages.

In one embodiment, the electronic device includes a touch device and a processor. The processor is electrically connected to the touch device. When at least one continuous back-and-forth moving touch trace is formed on the touch device during a predetermined period, the processor switches one of a plurality of modes of the electronic device to another.

In one embodiment, when at least one touch signal detected by the touch device successively moves along a plurality of paths, the processor determines whether a duration during which the at least one touch signal moves along the plurality of paths is shorter than the predetermined period, determines whether each of the plurality of paths is longer than a predetermined distance, and determines whether an included angle between any two continuous paths of the plurality of paths is within an acute angle range; when the duration is shorter than the predetermined period, when each of the plurality of paths is longer than the predetermined distance, and when the included angle between any two continuous paths of the plurality of paths is within the acute angle range, the processor determines that the at least one continuous back-and-forth moving touch trace is formed on the touch device during the predetermined period.

In one embodiment, when at least one touch signal detected by the touch device successively moves from a first position to a second position, then to a third position, the processor defines at least one interval based on coordinates of the first and second positions, determines whether a coordinate of the third position is within the at least one interval, and determines whether a track from the second position towards the third position passes through the at least one interval; when the coordinate of the third position is within the at least one interval, or when the coordinate of the third position is not within the at least one interval but the track from the second position towards the third position passes through the at least one interval, the processor determines that the at least one continuous back-and-forth moving touch trace is formed on the touch device.

In one embodiment, when at least one touch signal detected by the touch device successively moves from a first position to a second position, then to a third position, the processor divides a first track from the first position to the second position into a first set of vectors in an orthogonal coordinate system, divides a second track from the second position to the third position into a second set of vectors in the orthogonal coordinate system, and determines whether the first set of vectors and the second set of vectors are in reverse direction; when the first set of vectors and the second set of vectors are in the reverse direction, the processor determines that the at least one continuous back-and-forth moving touch trace is formed on the touch device.

In one embodiment, when at least one touch signal detected by the touch device successively moves from a first position to a second position, next to a third position, and then to a fourth position, the processor defines at least one interval based on coordinates of the second and third positions, and determines whether a line directed from the first position to the second position and another line directed from the third position to the fourth position are both extended in the at least one interval; when the lines are both extended in the at least one interval, the processor determines that the at least one continuous back-and-forth moving touch trace is formed on the touch device.

In one embodiment, the plurality of modes are a variety of modes and include a touch-pad input mode, a keyboard input mode, a multimedia mode and a presentation mode.

In one aspect, the present disclosure is directed to provide a control method of the electronic device having the touch device, and the control method includes steps of performing above-mentioned switching functions through the electronic device.

In view of the above, the present disclosure is related to improve the user experience, and focuses on providing a more convenient way to switch inputs. As long as the user's gesture moves back and forth on the touch device, the electronic device will automatically switch the input mode, thereby eliminating the tedious process, and thus, it is convenient for users to intuitively operate the electronic device.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
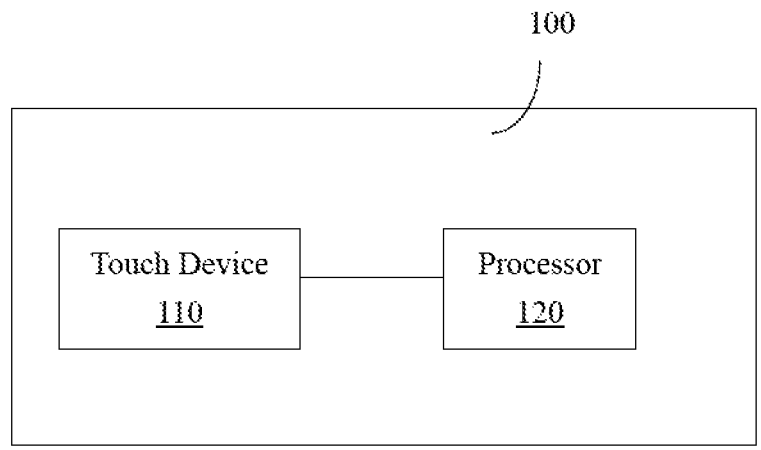
FIG. 1 is a block diagram of an electronic device according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

As used in the description herein and throughout the claims that follow, the meaning of "a", "an", and "the" includes reference to the plural unless the context clearly dictates otherwise.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

FIG. 1 is a block diagram of an electronic device 100 according to one embodiment of the present disclosure. As illustrated in FIG. 1, the electronic device 100 includes a touch device 110 and a processor 120. For example, the touch device 110 may be a touch pad or a touch panel, such as a resistive touch screen, a capacitive touch screen, an optical touch screen or an acoustic wave touch screen. The processor 120 may be a central processing unit (CPU), a micro controller or the like.

Structurally, The processor 120 is electrically connected to the touch device 110. A user may use 1-5 fingers, a stylus or the like to contact the touch device 110, and the touch device 110 can detect one or more contact points and generates one or more touch signals related to the one or more contact points. When the one or more touch signals (e.g., 1-5 signals) form at least one continuous back-and-forth moving touch trace on the touch device 110 during a predetermined period (e.g., 1.5 seconds), the processor 120 switches one mode to another mode. It should be noted that the electronic device 100 may have two or more modes, and when the user's gesture moves back and forth on the touch device 110, the processor 120 automatically switches one of a plurality of modes to another, thereby eliminating the tedious process, and thus, it is convenient for users to intuitively operate the electronic device 100.

In one embodiment, the plurality of modes are a variety of modes and include a touch-pad input mode, a keyboard input mode, a multimedia mode and a presentation mode. When the user's gesture moves back and forth on the touch device 110, the electronic device 100 automatically switches one mode to another mode; for example, the touch-pad input mode can be switched to the keyboard input mode, then to the multimedia mode, next to the presentation mode, and back to the touch-pad input mode. In the keyboard input mode, the keyboard can be a touch keyboard rendered on a screen or on a host, or a physical keyboard. In the input touch-pad mode, the touch device 110 be simulated to be a touch pad or a track pad that can control a cursor on the screen and can be used as a substitute for a mouse where desk space is scarce. In the multimedia mode, the screen can display multimedia content. In the presentation mode, the screen can show presentations.

Figure 2:
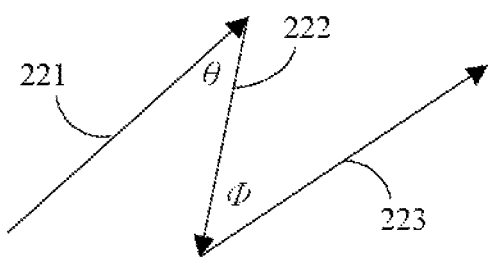
FIGS. 2-5C are schematic cross-section views illustrating the movement of a touch signal according to one or more embodiments of the present disclosure.

In one embodiment, the electronic device 100 is based on time, distance, track, angle and/or other parameters to determine whether the touch signal moves back and forth. In particular, referring to FIGS. 1 and 2, when at least one touch signal (e.g., 1-5 signals) detected by the touch device 110 successively moves along a plurality of paths 221, 222 and 223, the processor 120 determines whether a duration during which the at least one touch signal moves along the plurality of paths 221, 222 and 223 is shorter than the predetermined period (e.g., 1.5 seconds), determines whether each of the plurality of paths is longer than a predetermined distance (e.g., 1 cm), and determines whether an included angle (e.g., $\theta$, $\phi$) between any two continuous paths of the plurality of paths 221, 222 and 223 is within an acute angle range (e.g., about 1°-70° or 1°-90°). When the duration is shorter than the predetermined period, when each of the plurality of paths 221, 222 and 223 is longer than the predetermined distance, and when the included angle (e.g., $\theta$, $\phi$) between any two continuous paths of the plurality of paths is within the acute angle range, the processor 120 determines that the at least one continuous back-and-forth moving touch trace is formed on the touch device 110 during the predetermined period, so as to switch one mode to another mode. Accordingly, in this embodiment, all of the touch signal (e.g., 1-5), the time (e.g., 1.5 seconds), the angle (e.g., acute angle) and the distance (e.g., 1 cm) are required for determination. In an alternative embodiment, it can be that when any one of the touch signal (e.g., 1-5 the time (e.g., 1.5 seconds), the angle (e.g., acute angle) and the distance (e.g., 1 cm) meets a requirement, the processor 120 switches one mode to another mode.

Figure 3A:
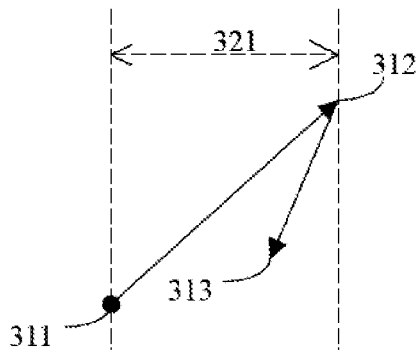
Figure 3B:
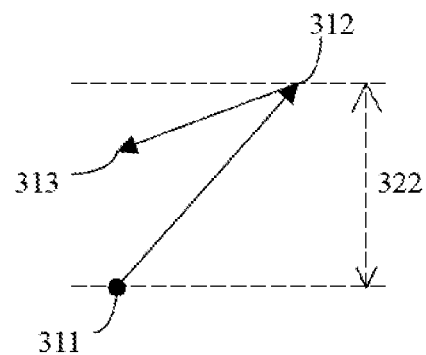
Figure 3C:
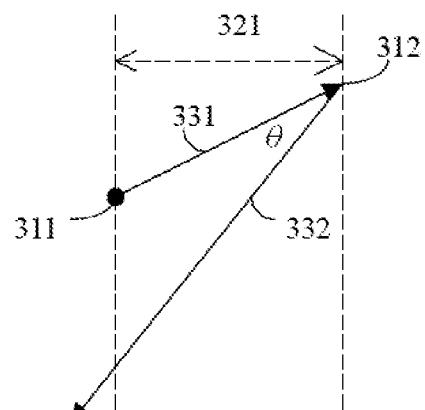

In one embodiment, the present disclosure provides an "interval determination method" to determine whether the touch signal moves back and forth. In particular, referring to FIGS. 1, 3A, 3B and 3C, when at least one touch signal detected by the touch device 110 successively moves from a first position 311 to a second position 312, then to a third position 313, the processor 120 performs the interval determination method to define at least one interval (i.e., a horizontal interval 321 as shown in FIG. 3A or a vertical interval 322 as shown in FIG. 3B) based on coordinates of the first and second positions 311 and 312, to determine whether a coordinate of the third position 313 is within the at least one interval (e.g., the horizontal interval 321), and to determine whether a track from the second position 312 towards the third position 313 passes through the at least one interval. When the coordinate of the third position 313 is within the at least one interval as shown in FIG. 3A, or when the coordinate of the third position 313 is not within the at least one interval but the track from the second position 312 towards the third position 313 passes through the at least one interval as shown in FIG. 3C, the processor 120 determines that the at least one continuous back-and-forth moving touch trace is formed on the touch device 110.

In another embodiment, the present disclosure provides an "acute determination method" to determine whether the touch signal moves back and forth. In particular, referring to FIGS. 1 and 3C, when at least one touch signal detected by the touch device 110 successively moves from a first position 311 to a second position 312, then to a third position 313, the processor 120 performs the interval determination method to determine whether an included angle θ between a first track 331 from the first position 311 towards the second position 312 and a second track 332 from the second position 312 towards the third position 313 is within the acute angle range. When the included angle θ is within the acute angle range, the processor 120 determines that the at least one continuous back-and-forth moving touch trace is formed on the touch device 110.

Figure 3D:
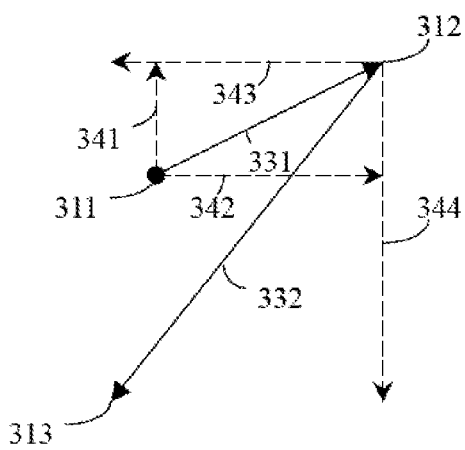

In yet another embodiment, the present disclosure provides a "vector determination method" to determine whether the touch signal moves back and forth. In particular, referring to FIGS. 1 and 3D, when at least one touch signal detected by the touch device 110 successively moves from a first position 311 to a second position 312, then to a third position 313, the processor 120 performs the vector determination method to divide a first track 331 from the first position 311 to the second position 312 into a first set of vectors 341 and 342 in an orthogonal coordinate system, to divide a second track 332 from the second position 312 to the third position 313 into a second set of vectors 343 and 344 in the orthogonal coordinate system, and to determine whether the first set of vectors 341 and 342 and the second set of vectors 343 and 344 are in reverse direction. When the first set of vectors 341 and 342 and the second set of vectors 343 and 344 are in the reverse direction, the processor 120 determines that the at least one continuous back-and-forth moving touch trace is formed on the touch device 110.

It should be noted that the interval determination method, the acute determination method and the vector determination method are three different ways as described above and may be used independently or in combination. As to the combination manner, referring to FIGS. 1 and 4, when at least one touch signal detected by the touch device 110 successively moves from a first position 411 to a second position 412, next to a third position 413, and then to a fourth position 414, the processor 120 performs the interval determination method to define at least one interval (i.e., a horizontal interval 421 or a vertical interval 422) based on coordinates of the second and third positions 412 and 413, and to determine whether a line directed from the first position 411 to the second position 412 and another line directed from the third position 413 to the fourth position 414 are both extended in the at least one interval (e.g., the vertical interval 422). Next, the processor 120 performs the acute determination method to determine whether an included angle θ between a first track 431 from the first position 411 to the second position 412 and a second track 432 from the second position 412 to the third position 413 and another included angle φ between the second track 432 and a third track 433 from the third position 413 to the fourth position 414 are within the acute angle range respectively. Then, the processor 120 performs the vector determination method to divide the first track 431 into a first set of vectors 441 and 442 in an orthogonal coordinate system, to divide the second track 432 into a second set of vectors 443 and 444 in the orthogonal coordinate system, to divide the third track 433 into a third set of vectors 445 and 446 in the orthogonal coordinate system, and to determine whether the first set of vectors 441 and 442 and the second set of vectors 443 and 444 are in reverse direction, and whether the second set of vectors 443 and 444 and the third set of vectors 445 and 446 are in reverse direction. When the lines are extended in the at least one interval (e.g., the vertical interval 422), when each of the included angles θ and φ is within the acute angle range, when the first set of vectors and the second set of vectors are in reverse direction, and when the second set of vectors and the third set of vectors are in reverse direction, the processor 120 determines that the at least one continuous back-and-forth moving touch trace is formed on the touch device 110.

As to the interval determination method with respect to FIGS. 3A-3D and 4, one of ordinary skill in the art will appreciate that the above horizontal and vertical intervals are provided for illustrative purposes only to further explain applications of the present invention and are not meant to limit the present invention in any manner. Other interval (e.g., parallel interval 510, 520, or 530) may be used as appropriate for the interval determination method. In particular, referring to FIGS. 1 and 5, when at least one touch signal detected by the touch device 110 successively moves from a first position 411 to a second position 412, next to a third position 413, and then to a fourth position 414, the processor 120 defines at least one interval (i.e., parallel interval 510, 520, or 530) based on coordinates of the second and third positions 412 and 413, and determines whether a line directed from the first position 411 to the second position 412 and another line directed from the third position 413 to the fourth position 414 are both extended in the at least one interval (e.g., parallel interval 510). When the lines are both extended in the at least one interval (e.g., parallel interval 510), the processor 120 determines that the at least one continuous back-and-forth moving touch trace is formed on the touch device 110.

Figure 6:
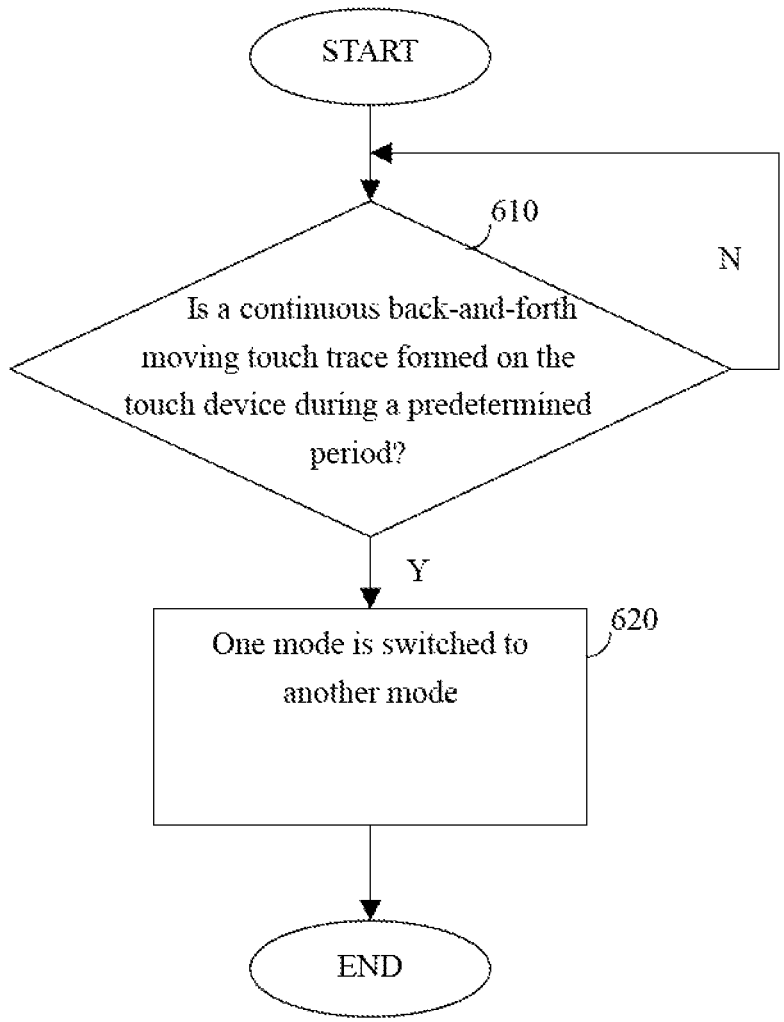
FIG. 6 is a flow diagram of a control method of the electronic device according to one embodiment of the present disclosure.

FIG. 6 is a flow diagram of a control method 600 of the electronic device according to one embodiment of the present disclosure. As illustrated in FIG. 6, the control method 600 includes steps 610 and 620. The steps are not recited in the sequence in which the steps are performed. That is, unless the sequence of the steps is expressly indicated, the sequence of the steps is interchangeable, and all or part of the steps may be simultaneously, partially simultaneously, or sequentially performed. It should be noted that those implements to perform the steps in the control method 600 are disclosed in above embodiments and, thus, are not repeated herein.

Step 610 is to determine whether at least one continuous back-and-forth moving touch trace is formed on the touch device during a predetermined period. Step 620 is to switch one of a plurality of modes of the electronic device to another when the at least one continuous back-and-forth moving touch trace is formed on the touch device during the predetermined period.

In one embodiment, the control method 600 is based on time, distance, track, angle and/or other parameters to determine whether the touch signal moves back and forth. In particular, when at least one touch signal detected by the touch device successively moves along a plurality of paths, whether duration during which the at least one touch signal moves along the plurality of paths is shorter than the predetermined period, whether each of the plurality of paths is longer than a predetermined distance, and whether an included angle between any two continuous paths of the plurality of paths is within an acute angle range are determined in step 610. When the duration is shorter than the predetermined period, when each of the plurality of paths is longer than the predetermined distance, and when the included angle between any two continuous paths of the plurality of paths is within the acute angle range, it is determined that the at least one continuous back-and-forth moving touch trace is formed on the touch device during the predetermined period.

When the touch signal moves, the control method 600 determines whether the touch signal moves back and forth based on movement directions, angles, vectors and/or other parameters. In one embodiment, as shown in FIGS. 3A, 3B and 3C, when at least one touch signal detected by the touch device successively moves from a first position 311 to a second position 312, then to a third position 312, step 610 is performed to define at least one interval based on coordinates of the first and second positions 311 and 312, to determine whether a coordinate of the third position 313 is within the at least one interval, and to determine whether a track from the second position 312 towards the third position 313 passes through the at least one interval. When the coordinate of the third position 313 is within the at least one interval, or when the coordinate of the third position 313 is not within the at least one interval but the track from the second position 312 towards the third position 313 passes through the at least one interval, it is determined that the at least one continuous back-and-forth moving touch trace is formed on the touch device.

Figure 4:
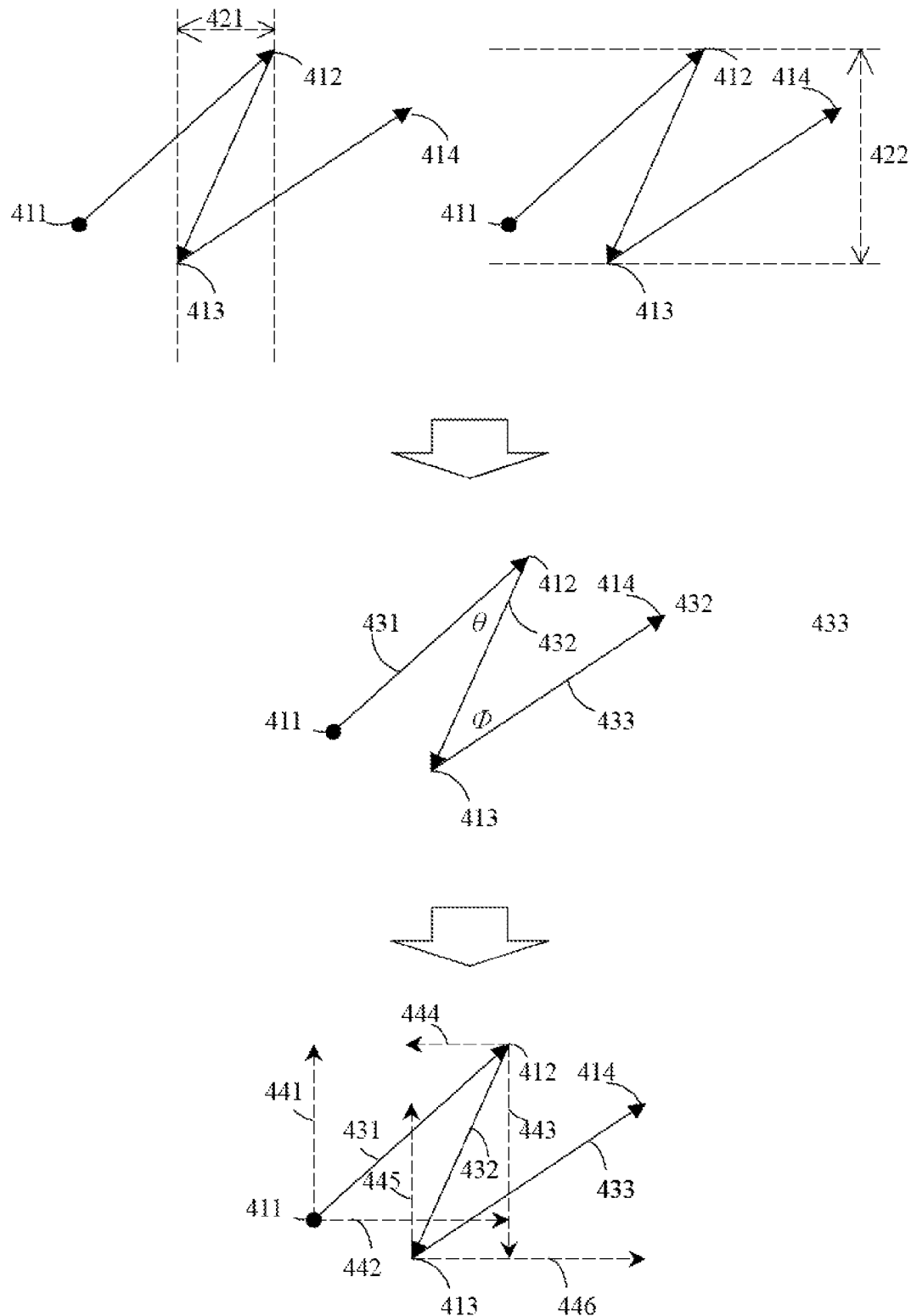
Figure 5A:
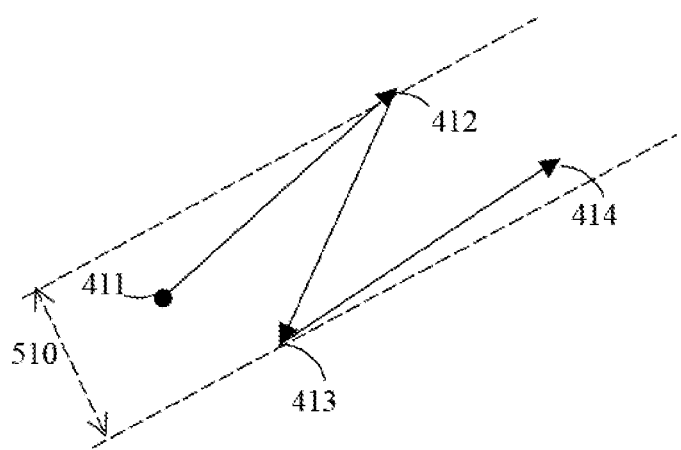
Figure 5B:
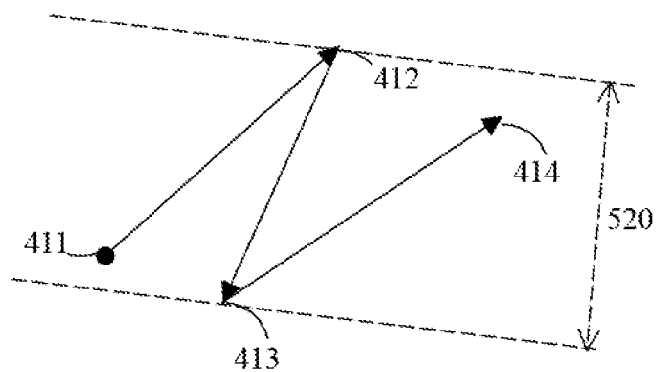
Figure 5C:
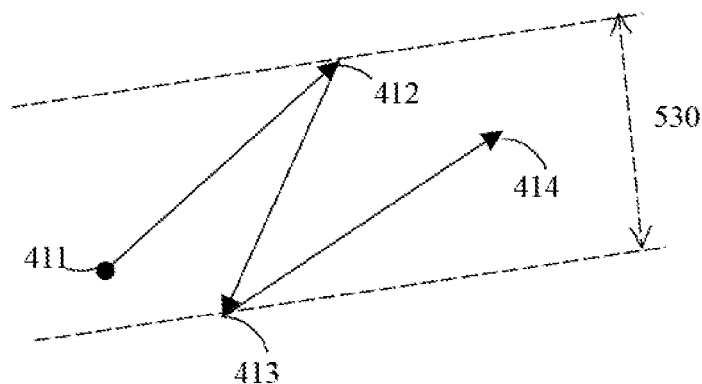

In another embodiment, when at least one touch signal detected by the touch device successively moves from a first position 311 to a second position 312, then to a third position 312, step 610 is performed to divide a first track 331 from the first position 311 to the second position 312 into a first set of vectors 341 and 342 in an orthogonal coordinate system, to divide a second track 332 from the second position 312 to the third position 313 into a second set of vectors 343 and 344 in the orthogonal coordinate system, and to determine whether the first set of vectors 341 and 342 and the second set of vectors 343 and 344 are in reverse direction. When the first set of vectors and the second set of vectors are in the reverse direction, it is determined that the at least one continuous back-and-forth moving touch trace is formed on the touch device In yet another embodiment, as shown in FIG. 4, when at least one touch signal detected by the touch device 110 successively moves from a first position 411 to a second position 412, next to a third position 413, and then to a fourth position 414, step 610 is performed to define at least one interval (i.e., a horizontal interval 421 or a vertical interval 422) based on coordinates of the second and third positions 412 and 413, and to determine whether a line directed from the first position 411 to the second position 412 and another line directed from the third position 413 to the fourth position 414 are both extended in the at least one interval (e.g., vertical interval 422). When the lines are both extended in the at least one interval (e.g., vertical interval 422), it is determined that the at least one continuous back-and-forth moving touch trace is formed on the touch device.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. An electronic device, comprising:
a touch device; and
a processor electrically connected to the touch device and configured to switch one of a plurality of modes of the electronic device to another when at least one continuous back-and-forth moving touch trace is formed on the touch device during a predetermined period,
wherein when at least one touch signal detected by the touch device successively moves from a first position to a second position, next to a third position, and then to a fourth position, the processor defines at least one interval based on coordinates of the second and third positions, and determines whether a line directed from the first position to the second position and another line directed from the third position to the fourth position are both extended in the at least one interval; when the lines are both extended in the at least one interval, the processor determines that the at least one continuous back-and-forth moving touch trace is formed on the touch device.

2. The electronic device of claim 1, wherein when at least one touch signal detected by the touch device successively moves along a plurality of paths, the processor determines whether a duration during which the at least one touch signal moves along the plurality of paths is shorter than the predetermined period, determines whether each of the plurality of paths is longer than a predetermined distance, and determines whether an included angle between any two continuous paths of the plurality of paths is within an acute angle range; when the duration is shorter than the predetermined period, when each of the plurality of paths is longer than the predetermined distance, and when the included angle between any two continuous paths of the plurality of paths is within the acute angle range, the processor determines that the at least one continuous back-and-forth moving touch trace is formed on the touch device during the predetermined period.

3. The electronic device of claim 1, wherein when at least one touch signal detected by the touch device successively moves from a first position to a second position, then to a third position, the processor defines at least one interval based on coordinates of the first and second positions, determines whether a coordinate of the third position is within the at least one interval, and determines whether a track from the second position towards the third position passes through the at least one interval; when the coordinate of the third position is within the at least one interval, or when the coordinate of the third position is not within the at least one interval but the track from the second position towards the third position passes through the at least one interval, the processor determines that the at least one continuous back-and-forth moving touch trace is formed on the touch device.

4. The electronic device of claim 1, wherein when at least one touch signal detected by the touch device successively moves from a first position to a second position, then to a third position, the processor divides a first track from the first position to the second position into a first set of vectors in an orthogonal coordinate system, divides a second track from the second position to the third position into a second set of vectors in the orthogonal coordinate system, and determines whether the first set of vectors and the second set of vectors are in reverse direction; when the first set of vectors and the second set of vectors are in the reverse direction, the processor determines that the at least one continuous back-and-forth moving touch trace is formed on the touch device.

5. The electronic device of claim 1, wherein the plurality of modes are a variety of modes and include a touch-pad input mode, a keyboard input mode, a multimedia mode and a presentation mode.

6. The electronic device of claim 1, wherein the switching of the modes follows each other in rotation.

7. A control method of an electronic device having a touch device, comprising steps of:

(a) determining whether at least one continuous back-and-forth moving touch trace is formed on the touch device during a predetermined period; and (b) switching one of a plurality of modes of the electronic device to another when the at least one continuous back-and-forth moving touch trace is formed on the touch device during the predetermined period, wherein the step (a) comprises:

when at least one touch signal detected by the touch device successively moves from a first position to a second position, next to a third position, and then to a fourth position, defining at least one interval based on coordinates of the second and third positions, and determines whether a line directed from the first position to the second position and another line directed from the third position to the fourth position are both extended in the at least one interval; and when the lines are both extended in the at least one interval, determining that the at least one continuous back-and-forth moving touch trace is formed on the touch device.

8. The control method of claim 7, wherein the step (a) comprises:

when at least one touch signal detected by the touch device successively moves along a plurality of paths, determining whether a duration during which the at least one touch signal moves along the plurality of paths is shorter than the predetermined period, determining whether each of the plurality of paths is longer than a predetermined distance, and determining whether an included angle between any two continuous paths of the plurality of paths is within an acute angle range;

when the duration is shorter than the predetermined period, when each of the plurality of paths is longer than the predetermined distance, and when the included angle between any two continuous paths of the plurality of paths is within the acute angle range, determining that the at least one continuous back-and-forth moving touch trace is formed on the touch device during the predetermined period.

9. The control method of claim 7, wherein the step (a) comprises:

when at least one touch signal detected by the touch device successively moves from a first position to a second position, then to a third position, defining at least one interval based on coordinates of the first and second positions, determining whether a coordinate of the third position is within the at least one interval, and determining whether a track from the second position towards the third position passes through the at least one interval; and when the coordinate of the third position is within the at least one interval, or when the coordinate of the third position is not within the at least one interval but the track from the second position towards the third position passes through the at least one interval, determining that the at least one continuous back-and-forth moving touch trace is formed on the touch device.

10. The control method of claim 7, wherein the step (a) comprises:

when at least one touch signal detected by the touch device successively moves from a first position to a second position, then to a third position, dividing a first track from the first position to the second position into a first set of vectors in an orthogonal coordinate system, dividing a second track from the second position to the third position into a second set of vectors in the orthogonal coordinate system, and determining whether the first set of vectors and the second set of vectors are in reverse direction; and when the first set of vectors and the second set of vectors are in the reverse direction, determining that the at least one continuous back-and-forth moving touch trace is formed on the touch device.

11. The control method of claim 7, wherein the plurality of modes are a variety of modes and include a touch-pad input mode, a keyboard input mode, a multimedia mode and a presentation mode.

12. The control method of claim 7, wherein the switching of the modes follows each other in rotation.

* * * * *